Aug. 30, 1960  V. F. DE VOST  2,950,622
DISCRIMINATING COPPER-BALL DECELEROMETER
Filed Aug. 14, 1959  3 Sheets-Sheet 1

INVENTOR.
V. F. DEVOST

BY
ATTORNEYS

Aug. 30, 1960

V. F. DE VOST 2,950,622

DISCRIMINATING COPPER-BALL DECELEROMETER

Filed Aug. 14, 1959

INVENTOR.
V. F. DEVOST

BY

ATTORNEYS.

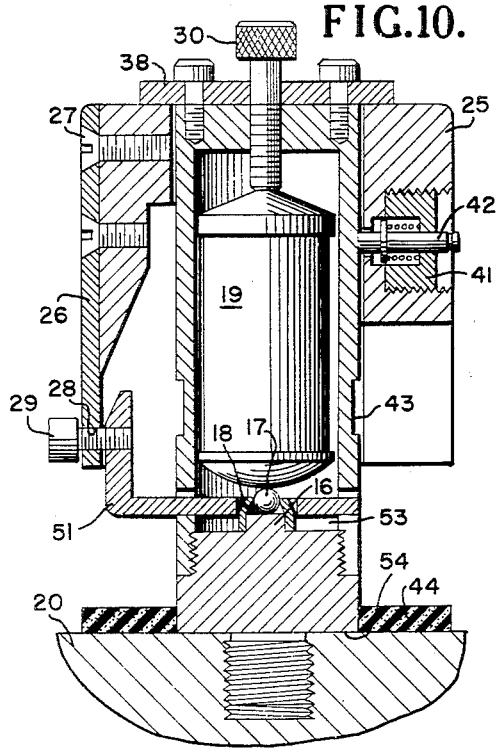

United States Patent Office 2,950,622
Patented Aug. 30, 1960

2,950,622

DISCRIMINATING COPPER-BALL DECELEROMETER

Valmore F. De Vost, Silver Spring, Md., assignor to the United States of America as represented by the Secretary of the Navy Filed Aug. 14, 1959, Ser. No. 833,891

11 Claims. (Cl. 73—492)

(Granted under Title 35, U.S. Code (1952), sec. 266)

This invention described herein may be manufactured and used by or for the Government of the United States of America for governmental purposes without the payment of any royalties thereon or therefor.

This invention relates to a peak deceleration recording decelerometer in which a copper ball is employed as the "spring" in an undamped, peak-indicating, mass-spring system and more particularly to a copper ball decelerometer in which means are employed for preventing spurious deformation of the ball at all times except when a shock of predetermined character is received.

A copper-ball decelerator may be regarded as a member of a family of peak-reading, unidirectional, self-contained, mechanical gages in which an inertial weight is employed as the mass and a small copper ball as the "spring" in this system. The ball is composed preferably of copper for the reason that such a ball exhibits relatively linear force-deflection characteristics over a wide range of forces applied thereto, although, if desired, a ball composed of aluminum or other soft metal suitable for the purpose may be employed. The inertia weight employed with the device is selected on the basis of the deceleration range anticipated and the weight influences both the natural frequency and the sensitivity of the decelerator or gage. Under relative motion of the inertia weight with respect to the housing, the copper ball is deformed plastically and this deformation is subsequently measured and interpreted as the peak deceleration by comparison with a static calibration curve.

It has been found as the result of actual tests that the copper-ball decelerometer response essentially follows the basic differential equation of a mass-spring system with the restriction that the copper ball deformation is plastic. This response has a linear dependence upon temperature, the deformation of the ball at −55° F. being approximately 15% less than that at 150° F. for equivalent loads. Under non-axial loads up to 60% of obliquity, the decelerometer responds to the peak axial component within ±10%. The copper-ball decelerometer of the present invention is particularly well suited for shock measurements of a particular character which are of a high degree of accuracy by reason of the fact that spurious shocks are prevented from being applied to the copper ball in such a manner that the only shock which the copper ball receives is the particular shock to be measured. A copper-ball decelerometer is usually referred to as being peak reading in character for the reason that they yield more information regarding the peak value of the desired shock and for the further reason that the copper ball decelerometer is less expensive than a continuous recording system employing strain gages and the like and requires less space in the object to be tested.

Copper-ball decelerometers of the type heretofore defined have not been altogether satisfactory under all conditions of service for the reason that they record not only the desired shock but also other shocks which may occur either before or after the desired shock is received and which may be of such magnitude as to additionally deform the copper ball.

The device of the present invention possesses all of the advantages of the prior art devices and none of the foregoing disadvantages. In accordance with the present invention this object is achieved by inserting a wedge-like structure between the inertial mass and the copper ball in such manner as to prevent the mass from striking the ball until such time as the desired shock is received and for thereafter preventing the inertial mass from additionally deforming the ball, as will be more clearly apparent as the description proceeds.

One of the objects of the present invention is the provision of a copper-ball decelerometer having new and improved means for preventing deformation of the ball in response to shocks received by the device other than the desired shock to be recorded.

Another object is the provision of new and improved means for locking a copper ball type decelerometer in a non-recording condition until a shock of predetermined character is received thereby.

Still another object is the provision of a new and improved copper ball decelerometer for recording a particular shock to the exclusion of other shocks received thereby.

A still further object is to provide a copper ball type decelerometer having new and improved means for selecting for recordation a shock impulse received thereby and, following a first shock impulse of predetermined character and for rendering the decelerometer ineffective to record shock impulses received thereby subsequent to the recorded impulse.

Still other objects, advantages and improvements will be apparent from the following description taken in connection with the accompanying drawings in which:

Fig. 10 is a view in elevation and partly in section of the device of Fig. 1 according to still another alternative form thereof;

Fig. 11 is a view partly in section of the device of Fig. 10 after a recording operation has been achieved;

Fig. 12 is a view in perspective of the shear wedge employed with the device of Fig. 10; and Fig. 13 is a graph illustrating the shock recorded by the device of Fig. 10 to the exclusion of other shocks received before and after the recorded shock.

Figure 1:
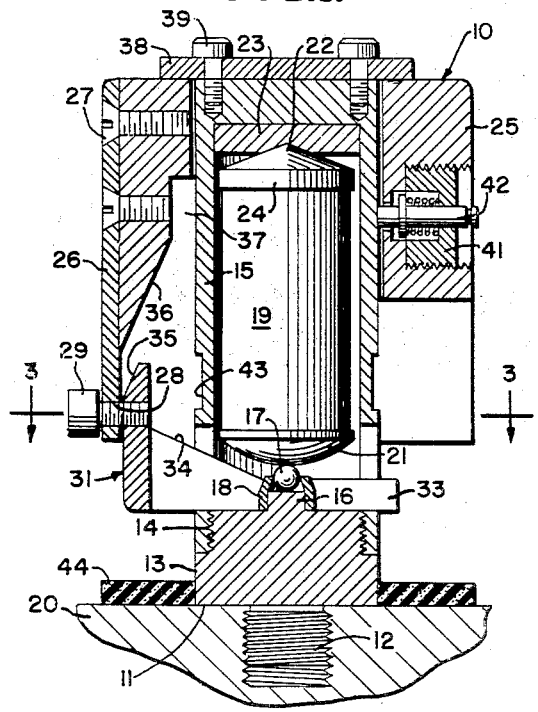
Fig. 1 is an elevational view in section of the device of the instant invention in an initial locked condition according to a preferred embodiment thereof.

Referring now to the drawings for a more complete understanding of the invention on which like numerals of reference are employed to designate like parts throughout the several views and more particularly to Fig. 1 thereof, there is shown thereon a copper ball decelerator designated generally by the numeral 10 comprising a base 11 having a threaded stud 12 secured thereto for attachment to the object 20 to be tested and a circular upstanding portion 13 threaded at 14 to receive and support a sleeve 15 secured thereto. The base is provided with an anvil 16 upon which is placed a copper ball 17, the ball being retained in position on the anvil by any suitable means such, for example, as the thin sleeve 18 illustrated.

An inertial mass 19 provided with a rounded end portion 21 for engagement with the copper ball and a conical end portion 22 at the opposite end thereof for engagement with a pad 23 composed of rubber or the like is slideably disposed within a cylindrical portion 24 of the sleeve member 15. The inertial mass 19 is composed of any material suitable for the purpose, such, for example, as hardened steel to which a coating of chromium plating has been applied over approximately .0001 inch.

Figure 4:
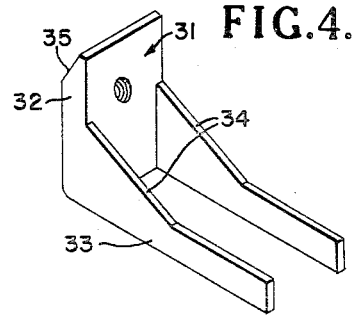
Fig. 4 is a view in perspective of the wedge mechanism of Figs. 1 and 2.

A second inertial mass 25 configured generally as a sleeve or collar encircling sleeve 15 for slideable movement therealong is provided with a downwardly projecting portion 26 secured thereto as by the screws 27 and having an aperture 28 therein for receiving a screw 29 threaded into wedge member 31, the screw being composed of a material known in the art as Teflon or the like and adapted to be sheared in response to a force suddenly applied thereto by inertia collar 25. As more clearly shown on Fig. 4 the wedge member 31 comprises an upstanding portion 32 to which are affixed two laterally extending members 33 slideable within suitable apertures formed in sleeve 15 from an initial locked position thereof as shown on Fig. 1 to a moved position, Fig. 2. The laterally extending members 33 in combination with the upstanding portion 32 comprises a bifurcated structure having inclined cam surfaces 34 formed thereon for engagement with the rounded end portion 21 of inertial mass 19 to maintain the inertial mass 19 disengaged from the flattened copper ball 16 after a single recording operation.

Figure 2:
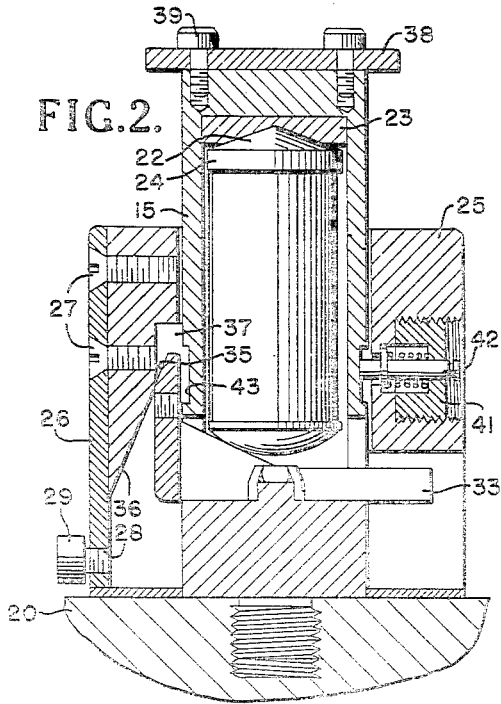
Fig. 2 is a view similar to Fig. 1 on which is shown a device in a second locked condition after a shock has been recorded thereby.
Figure 3:
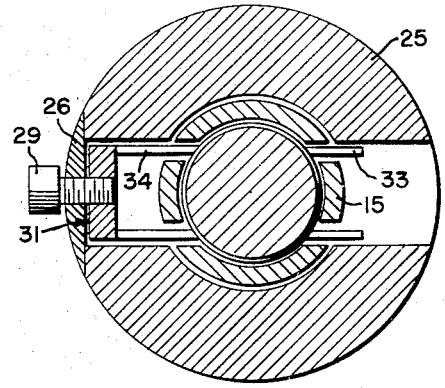
Fig. 3 is a view somewhat enlarged taken along the line 3—3 of Fig. 1.

The wedge member 31 is also provided with an inclined cam surface 35 for engagement with a complementary cam surface 36 formed interiorly on the inertial mass 25 and disposed within a recess 37 of sufficient size to provide clearance between the inertial collar 25 and the wedge member 31 sufficient to allow free slideable movement of the wedge member as the inertial collar moves to the final locked position thereof as shown in Fig. 2.

A stop plate 38 is secured as by the screws 39 to the top portion of sleeve 15 thereby to limit upward movement of the inertial collar 25.

Threaded into the inertial mass 25 is a plug 41 carrying a spring pressed detent 42 for engagement with an annular register 43 formed on the outer surface of sleeve 15 when the inertial mass 25 has been moved to the final position of Fig. 2 thereby providing means for locking the inertial mass in the final position.

There is also preferably provided about the sleeve 15 an annular pad 44 to absorb the shock of impact of the inertia member 25 against the supporting plate 20 to which the base 11 is secured sufficiently to prevent rebound thereof when the mass 25 is moved to the position shown on Fig. 2 following a recording operation.

Figure 6:
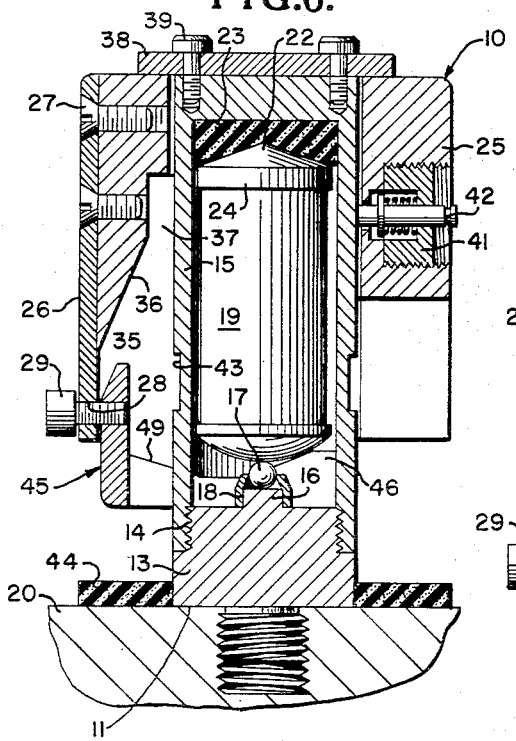
Fig. 6 is an elevational view partly in section of the copper ball decelerometer device of Fig. 1 according to an alternative form thereof.

The device of Fig. 6 is generally similar to the device of Fig. 1 but differs therefrom in the configuration of the release wedge 45 employed therewith. The release wedge 45 differs from the wedge member 31 of Fig. 4 in the configuration of the cam surfaces formed on the two laterally extending members 46 thereof. The wedge comprises a cam surface 47 on each of the members 46 so configured and arranged as to maintain the inertial mass 19 disengaged from the copper ball 17, Fig. 6, when the device is in a initial locked condition. These cam surfaces 47 are contiguous with a pair of surfaces 48 so disposed that the inertial mass 19 can strike and deform the copper ball 17 when the surfaces 48 are directly beneath the center line of the inertial mass 19. The surfaces 48 are contiguous with a pair of cam surfaces 49 inclined with respect thereto in such manner that the inertial mass 19 is moved and maintained in a locked position thereby in such manner that the inertial mass 19 is rendered ineffective to deform the copper ball 17 additionally in response to shock impulses applied thereto subsequent to a recording operation.

On Fig. 10 is shown still another alternative form of the device of Fig. 1 in which the wedge member thereof is configured as in Fig. 12. This member is generally designated by the numeral 51 and provided with an aperture 52 substantially as shown of such size as to receive the copper ball 17 and sleeve 18 with sufficient clearance therebetween to allow the ball to drop into an annular recess 53 formed in base member 54 when the wedge member 51 has been moved to the position shown on Fig. 11 following a recording operation.

The operation of the device of Fig. 1 will now be described with reference to a specific example of use thereof. Let it be assumed, by way of example, that the copper ball decelerometer of Fig. 1 is installed within a mine of the type adapted to be planted from an aircraft in flight from a high altitude, and let it further be assumed that a parachute is not employed to retard the downward flight of the mine through the air. It is the usual practice, when testing mines under these conditions, to plant them in a body of water of a depth not to exceed 100 feet whereby the mine may subsequently be recovered by a diver operation for examination and determination of the force of impact of the mine with the surface of the water as recorded on the copper ball 17.

When the mine strikes the surface of the water, the Teflon screw 29 is sheared by the inertia of the mass 25 and concurrently therewith the mass of the inertial element 19 causes a sudden force to be applied to the copper ball by reason of the inertia thereof sufficient to flatten the ball as shown on Fig. 2. Concurrently therewith the inertial collar 25 moves downwardly along sleeve member 15, the degree of such movement being sufficient to provide time for the deformation of copper ball 17 before cam surface 36 engages the cam surface 35. As these cam surfaces are engaged, the wedge member 31 is suddenly driven to the right, as viewed in the drawing, forcing inertial mass 19 upwardly to the position shown on Fig. 2 out of engagement with the copper ball. The detent 42 now enters register 43 to lock the inertial mass 25 in the operated position thereof which, in turn, locks the wedge member 31 in the final moved position thereof thereby to prevent further deformation of the ball 17 by inertia member 19 as subsequent shocks are received by the device.

Figure 5:
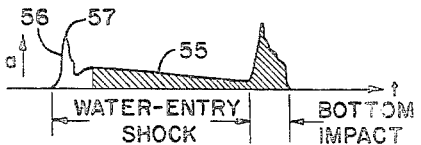
Fig. 5 is a graph illustrating the shock recorded by the device of Fig. 1 upon water entry of a body carrying the device and shocks subsequently received by the device and not recorded.

This condition will best be understood by reference to Fig. 5 on which is shown by the curve 55 the series of shocks received by the device as the mine carrying the device strikes the surface of the water and subsequently comes to rest on the bottom. The inertial force corresponding to the impact of the mine against the surface of the water is shown by the spiked portion of curve 55 designated 56 which is of sufficient force to shear the Teflon screw 29 and effect a recordation of the ball 17, at point 57 of curve 55. The deformation of copper ball 17 is complete and the wedge member 31 is now moved to a locking position to maintain the inertial mass 19 disengaged from the flattened ball 17. The device is thus rendered ineffective to record additional shocks applied thereto as the result of water drag on the mine and impact of the mine against the bottom.

The operation of the device of Fig. 10 will now be described with particular reference to a particular example. Let it be assumed, by way of example, that the device of Fig. 10 is employed with a rocket, projectile, ahead-thrown depth charge or the like in which there is a considerable setback force applied thereto at the moment of discharge from the launching mechanism. This setback force, will be noted, is applied to the screw 30 by the inertial mass 19 and the setback force of the inertial collar 25 is absorbed by stop plate 38. This setback force is designated by the curve 58 illustrated on Fig. 13 and is in a direction to move the inertial mass 19 away from the copper ball 17 and thus there is no deformation of the copper ball in response to this setback force.

As the missile strikes the surface of the water, the shock of impact indicated at 59 causes the Teflon screw 29 to be severed and, concurrently therewith, the copper ball 17 to be deformed by the inertial mass 19. When sufficient time has elapsed for the deformation of the ball to be completed, the inertial sleeve 25 cammed the wedge member 51 to the position shown on Fig. 11 thereby moving the flattened copper ball to the right, as viewed in the figure, into registration with the annular recess 53 into which the ball is now free to fall. This action takes place at point 61 of curve 62 illustrated on Fig. 13. When this occurs, the hydrodynamic drag force on the missile and the force of impact of the missile with the bottom of the bed of water within which the missile is launched are ineffective to additionally deform the copper ball for the reason that the copper ball has been moved from anvil 16 into the recessed portion 53 of the base member.

Figure 7:
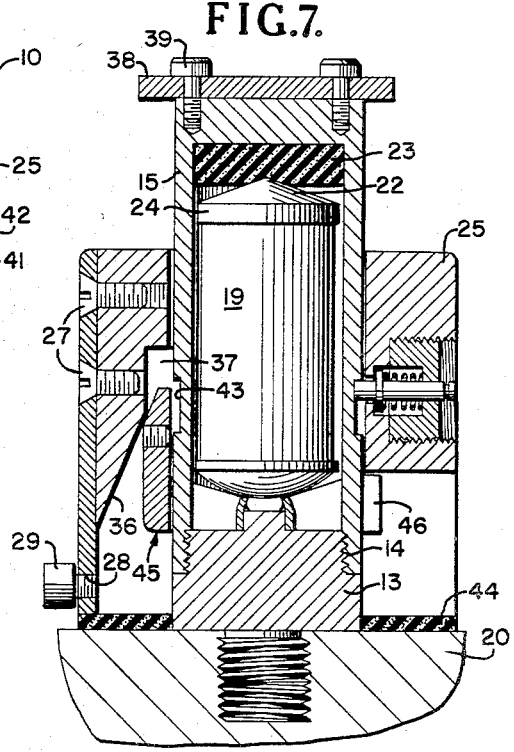
Fig. 7 is a view in section of the device of Fig. 6 after a recording operation has been achieved.
Figure 8:
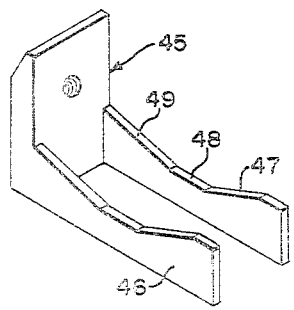
Fig. 8 is a view in perspective of the wedge release mechanism of the device of Fig. 6.
Figure 9:
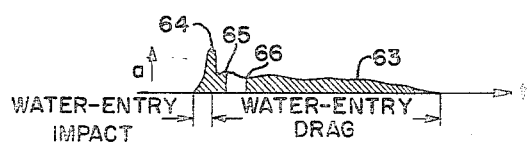
Fig. 9 is a graph illustrating a shock impulse recorded by the device of Fig. 6 following an initial shock impulse received thereby.

The device of Fig. 6 is particularly adapted for use with an aerial launched mine or the like for measuring and recording the force of the aerodynamic drag of water against the mine casing during a period immediately following the impact of the mine against the surface of the water. This novel result is achieved in the device of Fig. 6 by the laterally extending members 46 of the release wedge 45 employed therewith. As clearly shown on Fig. 6, the inertial member 19 is prevented from applying a force sufficient to deform the copper ball 17 by the cam surfaces 47 of the release wedge 45 until the wedge has been moved to the moved position of Fig. 7 by the inertial mass 25 following the shearing of the Teflon screw 29. This action will best be understood by reference to Fig. 9 on which is shown by curve 63 the water entry impact force at 64 and the water entry drag force immediately following. The release wedge 45 is moved to the moved position of Fig. 7 at point 65 of curve 63 and the force of the water dragging against the mine during the travel of the mine between points 65 and 66, for example, is thus recorded.

It will be understood that, by properly proportioning the parts, the release wedge 45, when moved to the final locked position will support inertia mass 19 by cam surfaces 49 thereof in such manner that further deformation of the copper ball 17 as the missile strikes the bottom of the bed of water is prevented.

Also, if desired, the time during which the rounded end of inertial mass 19 is unlocked to contact ball 17 for recordation of the shock may be extended by retarding or momentarily arresting the movement of release wedge 45 while the surface 48 thereof is aligned with the rounded end of mass 19. This may be accomplished by proper design of cam surfaces 35 and 36.

While the invention has been described with reference to three examples thereof which give satisfactory results, it is not so limited, as various changes and modifications will become apparent to one skilled in the art, after understanding the invention, without departing from the spirit and scope of the invention and it is intended, therefore, in the appended claims to cover all such changes and modifications.

What is claimed as new and desired to be secured by Letters Patent of the United States is:

1. A decelerometer for use with a missile dropped from an airborne vehicle into a body of water comprising a hollow cylindrical housing, a base secured to said housing and having a hardened anvil thereon, an inertia responsive mass slideable within said housing, stress means comprising a soft metal ball interposed between said inertia mass and said anvil and adapted to be deformed by said mass in response to a shock suddenly applied thereto, a second inertia responsive mass carried exteriorly by said housing for slideable movement therealong from an initial position to a moved position, a wedge member configured and disposed for slideable movement transversely within said housing from an initial position to a moved position, said wedge member having means thereon to disengage said first named mass from the ball after the ball has been deformed thereby and during movement of the member to said moved position, means including a shear pin for locking together said second inertia responsive mass and wedge member in their respective initial positions, said pin being adapted to be sheared in response to a shock pulse of predetermined strength applied to said second inertia responsive mass, and a pair of normally spaced cam surfaces on said second inertia responsive mass and on said wedge member respectively for moving said wedge member to said moved position thereof when said second mass has moved a predetermined distance along said housing.

2. A decelerometer according to claim 1 including means carried by said second inertia responsive mass for locking the wedge member in the moved position thereof.

3. A decelerometer according to claim 1 including means carried by said second inertia responsive mass for locking the second inertia responsive mass to said housing when the second inertia responsive mass has been moved to the moved position thereof.

4. A decelerometer according to claim 3 in which said inertia locking means comprises an annular groove formed in the outer surface of said housing and a spring pressed detent in said second inertia responsive mass disposed for cooperation therewith.

5. A decelerometer comprising a hollow cylindrical housing, an anvil disposed within said housing and secured to an end portion thereof, a soft metal ball disposed on said anvil, an inertia responsive mass slideably disposed within said housing in a manner to deform said ball in response to a force suddenly applied thereto, a normally locked second inertia responsive mass disposed for slideable movement on said housing from an initial position to a final position, means including a shear pin for unlocking said second mass in response to a first shock impulse applied thereto, and wedge means slideable within said housing from an initial position to a moved position and operable by said second mass during movement thereof for engaging said first named inertia responsive mass in a manner to prevent additional deformation of said ball thereby as additional shock impulses are received while the wedge means is in said moved position thereof.

6. A decelerometer according to claim 5 including means carried by said second inertia responsive means for locking said wedge means in said moved position when the second inertia responsive mass is in said final position.

7. A decelerometer according to claim 6 including means comprising a detent carried by said second inertia responsive mass for locking the second inertia responsive mass in said final position.

8. A decelerometer device for use with a gun launched missile adapted to be fired into a water target area comprising a hollow cylindrical housing, a base secured to said housing and having a circular hardened anvil thereon, an inertia responsive mass slideable within said housing from an initial position to a moved position and thereafter movable in a reverse direction to a final position, a soft metal ball of less diameter than said anvil interposed between said inertia responsive mass and the anvil and adapted to be deformed by said mass in response to the shock of water entry of a missile carrying the device, means carried by said housing for preventing movement of said inertia responsive mass in response to a setback force applied thereto as the missile is launched from a gun, means including a thin shearable sleeve encircling said anvil for retaining the ball on the anvil until the sleeve is sheared, a second inertia responsive mass slideably carried on said housing and movable from an initial locked position to a moved position by a shock pulse received as the missile strikes the surface of the water, a shear member moveable transversely within said casing in closely spaced adjacency to the face of said anvil from an initial position to a final position and having an aperture therein within which a portion of said sleeve is disposed thereby to shear said sleeve and displace the ball from said anvil after deformation thereof, an annular recess formed in said base encircling said anvil for receiving said displaced ball, and means including a cam surface on said second inertia responsive mass for moving said shear member to said final position thereof in time delayed relation to the deformation of the ball by said first named inertia responsive mass.

9. A decelerometer device according to claim 8 including means for locking said second inertia responsive mass and said shear member until said shock pulse is received by the second inertia responsive mass.

10. A decelerometer device according to claim 8 including means for locking said second inertia responsive mass and shear member in said moved and final positions, respectively.

11. A decelerometer shock recording device for use with a missile dropped from an airborne vehicle into a body of water comprising a hollow cylindrical housing, a base secured to said housing and having an anvil thereon, an inertia responsive mass slideable within said housing from an initial position to a moved recording position and moveable thereafter in a reverse direction to a final position and having a rounded end facing said anvil and aligned therewith, recording means comprising a soft metal ball secured to said anvil and adapted to be deformed by said mass in response to a shock applied thereto corresponding to the water entry drag of a missile carrying the device, a bifurcated wedge member configured and disposed for slideably movement transversely within said housing from an initial position to a moved position, a pair of inclined surfaces on each bifurcated portion of said wedge member normally engaging said inertia responsive mass in a manner to lock the inertia responsive mass in said initial position thereof and thereby prevent engagement of the ball therewith as a shock is received while the wedge member is in said initial position, a second pair of inclined surfaces on said wedge member configured and arranged to move the inertia responsive mass from said moved recording position to said final position as the wedge member moves into the moved position thereof, a pair of laterally disposed surfaces on said bifurcated portions of the wedge member interconnecting said first and second named inclined surfaces and configured to release the first named inertia responsive mass for movement to said moved recording position when said laterally disposed surfaces are moved into alignment with the rounded end of said first named inertia responsive mass, a normally locked second inertia responsive mass slideably carried by said housing and moveable from an initial position to a final position by a force applied thereto corresponding to the force of water entry of a missile carrying the device, means including a shear pin for releasing said second inertia responsive mass as said force is received thereby, and means including a pair of cam surfaces on said wedge member and said second inertia responsive mass respectively for moving the wedge member from the initial position to the final position thereof in time delayed relation with respect to the release of the second inertia responsive mass as to render the first named inertia responsive mass effective to deform and record on said ball the force of the water entry drag of the missile following water impact thereof.

References Cited in the file of this patent

UNITED STATES PATENTS

| | | |
|---|---|---|
| 2,574,600 | Stokes | Nov. 13, 1951 |
| 2,854,539 | Ruppel | Sept. 30, 1958 |